May 24, 1955 N. OPOTOW 2,708,789
DENTAL APPARATUS FOR USE IN MAKING ARTIFICIAL DENTURES
Filed Jan. 21, 1954 2 Sheets-Sheet 1
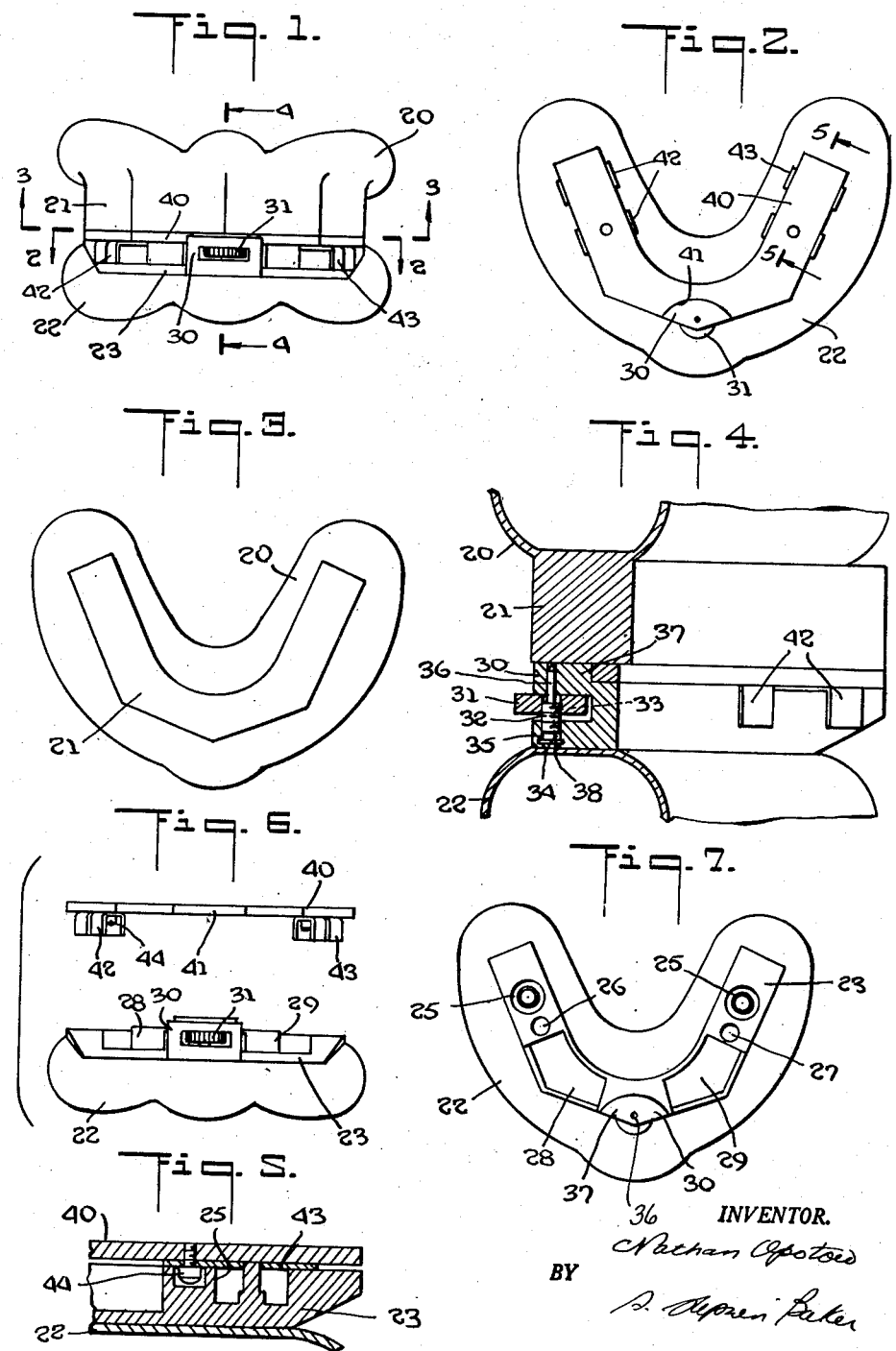

May 24, 1955   N. OPOTOW   2,708,789
DENTAL APPARATUS FOR USE IN MAKING ARTIFICIAL DENTURES
Filed Jan. 21, 1954   2 Sheets-Sheet 2

INVENTOR.
Nathan Opotow
BY
N. Stephen Baker
ATTORNEY

United States Patent Office 2,708,789
Patented May 24, 1955

2,708,789

DENTAL APPARATUS FOR USE IN MAKING ARTIFICIAL DENTURES

Nathan Opotow, Brooklyn, N. Y.

Application January 21, 1954, Serial No. 405,323

11 Claims. (Cl. 32—19)

This invention relates to dental plates and more particularly to an apparatus for securing a correct relationship between the component parts of the denture. The apparatus is an improvement over that disclosed in my prior Patent 2,507,118 of May 9, 1950.

As was set forth in the above patent, the fundamental steps in the construction of dental plates are:

(a) Taking an impression of the mouth in suitable plastic material.
(b) Forming a positive model from the impression.
(c) Forming a base plate on the model.
(d) Securing to the base plate a means to register the centric relation of the jaws, and
(e) Transferring the resulting registration of the mouth to an articulator and thereafter setting teeth on said model.

It was pointed out that the steps of securing the proper relationship of the jaws including the bite was most difficult of achievement and that various techniques for establishing centric and other functional relationships have been devised.

The above mentioned patent provided a new system wherein the bite was taken under simulated biting pressure, the biting pressure being arranged laterally and symmetrically so as to permit a better distribution of biting stresses and therefore a more positive functional seat for the ultimate dentures.

While the apparatus disclosed in the above mentioned patent has proven to be successful in operation and professional acceptance, there has been a demand for a still simpler although equally accurate system.

With the foregoing in mind, I have devised means for recording centric relation which is of pronounced simplicity while still securing superior results. A feature of the instant invention is that it largely adopts the elementary techniques with which most dentists are acquainted and modifies them with simple structure so as to secure far more accurate recording of centric relation.

I achieve the desired results by employing apparatus for only the lower jaw while the upper jaw is provided with a wax bite block with which all dentists are well acquainted since such wax bite block is used in the above mentioned elementary techniques. The instant invention further provides improved means for permitting the dentist to record the vertical relation of the dentures in substantially the same way that he was accumstomed to do. Such vertical relation will be recognized as being accomplished by adjusting the vertical height.

The invention will be further understood from the following description and drawings in which:

Figure 1 is a superimposed view of the two plates of the apparatus, the lower plate being secured to a lower base while the upper base is provided with a conventional form of wax block;

Figure 2 is a plan view as taken along the line 2—2 of Figure 1;

Figure 3 is a plan view as taken along the line 3—3 of Figure 1;

Figure 4 is an enlarged cross-sectional view as taken along the line 4—4 of Figure 1;

Figure 5 is an enlarged cross-sectional view as taken along the line 5—5 of Figure 2;

Figure 6 is an exploded view of the apparatus, the lower plate being secured to the lower base;

Figure 7 is a top plan view of the lower plate as secured to the lower base;

Figure 8:
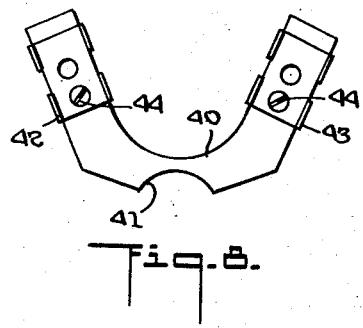
Figure 8 is a bottom plan view of the upper plate.

In the drawings, 20 is the upper base plate or base which may be fitted on an upper cast of the patient's mouth. A wax rim or bite block 21 is attached to the upper base plate in a manner which is largely conventional. The lower base plate 22 has mounted thereon the lower plate 23 of the instant apparatus. The mounting is effected by employing wax for adherence. The lower plate is properly centered and horizontal on the lower base plate as illustrated in Figures 6 and 7.

The lower plate 23 of the instant invention performs most of the required steps in taking the bite. It is substantially U-shaped and is formed with wells 25 which receive resilient balancing studs for permitting a bite under pressure as hereinafter described. It is further formed with two holes 26 and 27 which serve to accurately position the upper plate when it is secured thereto.

In the anterior region of plate 23 are formed two angular wells or chambers 28 and 29 which serve to receive wax pieces as indexes. In this way, the lower plate 23 may always be repositioned correctly in relation to the upper base after centric has been recorded.

In the front center of plate 23, is disposed a boss 30 which rotatably supports a knurled wheel 31. Wheel 31 has an internally threaded bore which meshes with a screw 32. Screw 32 is somewhat elongated and is prevented from rotation by having a vertical keyway 33 which is engaged by a key 34 formed in a bore 35 in the boss 30. As a result thereof, the rotation of wheel 31 effects vertical adjustment of screw 32. Integral with screw 32 is a pin or marker 36 which, therefore, rises and falls with rotation of the wheel 31. Pin 36 emerges from a hole formed in a raised arcuate platform 37 which is integral with the boss 30. A plug 38 miantains screw 32 in bore 35.

The upper plate of the apparatus comprises a U-shaped plate 40 which connects to the lower plate 23 when vertical relation of the ultimate dentures is to be accomplished. It must be noted that whereas plate 40 is designated as the upper plate, it is not such an upper plate as is used with the upper denture. It is referred to as an upper plate herein since it is disposed over the plate 23.

Upper plate 40 is formed with an arcuate cut-out 41 which conforms to the arcuate platform 36 so that the plate 40 does not affect the effective height of the plate 23 when it is connected thereto. Indeed, when the plates are connected as illustrated in Figure 7, the upper and lower surfaces of the connected plates are uniformly parallel. In order to secure the plate 40 to the plate 23, plate 40 is formed with spring clips 42 and 43 which embrace the respective free ends of the U-shaped plate 23. It will be noted that the clips 42 and 43 are connected to the plate 40 by screws 44. Accordingly, the holes 26 and 27 in plate 23 are positioned to receive these screws so as to permit the flush disposition of the upper plate on the lower plate. Of course, many other expedients can be employed for this purpose.

In using the apparatus, the dentist will have taken casts of the upper and lower jaws over which the base plates 20 and 22 are formed. The bite block 21 is then applied to base 20 while the lower plate 23 is secured to lower base plate 22. At this time, the vertical relation of the patient's jaws may be recorded.

When the vertical relation is determined, it will be noted that the upper plate 40 is secured to the lower plate 23 as above described. The knurled wheel must be turned down at this time so that the pin 36 is in a recessed or downward position since it is not used in determining vertical relation. In addition, the balancing studs, the use of which will be hereinafter described, are not employed at this time. It will be noted that the positioning of the upper plate 40 on the lower plate 23 provides the apparatus with a planar, smooth upper surface which is uniform since it is uninterrupted by any wells, holes or by the vertical pin 36. At this time, the base plates, wax block and the apparatus being in the patient's mouth, the wax block is adjusted by being built up or reduced until the correct vertical height is established. This is a familiar step to the dentist since he is accustomed to such adjustment in elementary apparatus. It is desirable to maintain the wax block in substantially continuous, even contact with the top surface of the upper plate 40. In accomplishing the vertical relation, the dentist, as is well known, should provide some freeway space between the wax block and the upper plate when the mandible is in its physiological rest position. At this time the bases are removed from the mouth, and the upper plate 40 is detached. There is no further use for this upper plate in the succeeding step which is to determine centric relation.

Figure 11:
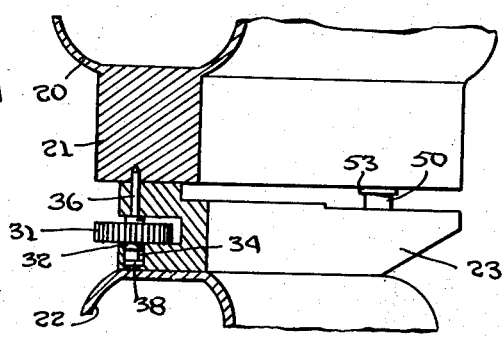
Figure 11 is an enlarged cross-sectional view as taken along the line 11—11 of Figure 9.
Figure 10:
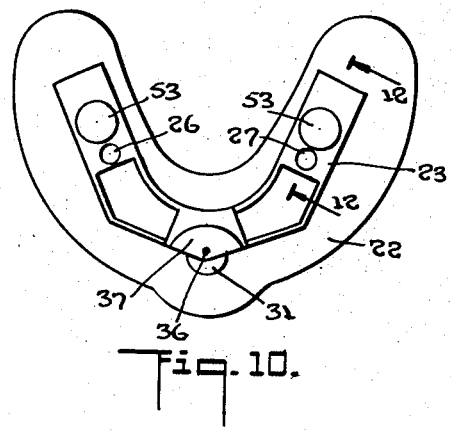
Figure 10 is a plan view of the lower plate as taken along the line 10—10 of Figure 9.
Figure 12:
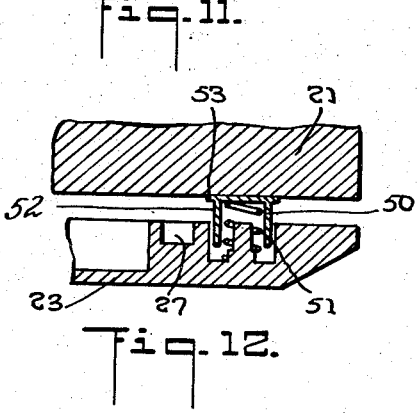
Figure 12 is an enlarged cross-sectional view as taken along the line 12—12 of Figure 10.
Figure 9:
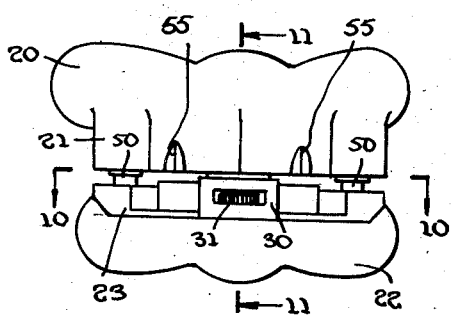
Figure 9 is a front view of the apparatus as in the mouth of a patient while the bite is being taken.

In determining centric relation, the balancing means described in my above mentioned prior patent, is employed. Thus, a pair of spring compression members or balancing studs 50 are inserted into the wells 24 and 25. Such balancing studs comprise coil springs 51 which are firmly retained in cups 52. The cups 52 are formed with flat heads 53. The studs 50 will be furnished in varying tensions. It will be recognized that the musculature of persons vary, an older person having less biting force than a younger person. Accordingly, the springs 51 may be chosen with this in mind. The studs having been inserted in the wells 25, the wheel 31 is then turned in order to raise the pin 36 to its maximum extent as illustrated in Figure 11. The range of travel of the pin or marker 36 is about one millimeter.

The bases are now restored to the patient's mouth so that the wax block 21 is opposed to the lower plate 23. At this time the patient may be directed to smile brightly and then to close rapidly. This will cause the pin or marker 35 to make an indentation in the wax block 21. This indentation is the straight closure centric index. In order to verify this centric index, the patient may repeat the smiling and closing procedure several times. It may be noted that the pin 36 automatically returns to the same index position in the wax block which is illustrated in Figure 11 and thus substantiates the accuracy of the establishment of centric relation. It will be understood that the spring balancing studs are compressed by the patient as he closes to record centric relation. This produces equalized or balanced pressures by the respective jaws and provides a more accurate recording as set forth in my above mentioned prior patent. However, in distinction to my prior patent, the instance balancing studs have flat heads since the recording is effected without grinding or chewing motions or the like.

Figure 13:
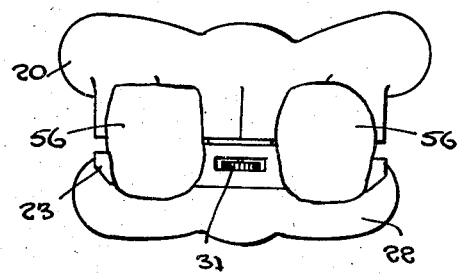
Figure 13 is a front view of the final position of the apparatus locked in such position by wax pieces.

At this time it is advisable to remove the upper base from the mouth and chill it thoroughly preparatory to the final taking of the bite. The wax surface should be dried and a pair of V-shaped cut-outs 55 formed in the wax block 21 directly opposite the receptacle or wells 28 and 29 of the lower plate 23. The upper base may then be reinserted in the patient's mouth and the patient should then smile brightly and close into the straight closure index which is illustrated in Figure 11. At this time two wads of soft wax 56 are pressed into both receptacles 28 and 29 so that they overlap the V-shaped cut-outs 55 as illustrated in Figure 13. Of course, plaster of Paris or any other recording medium may be used for this purpose. This records the centric relation which has been achieved. The wax locks 56 should then be chilled and the bases may be removed from the patient's mouth. At this time the balancing studs should be removed from the wells and the bases reassembled with the wax locks and sealed securely prior to the articulation of the casts.

What is claimed is:

1. A dental apparatus for use in making dentures comprising a pair of substantially U-shaped plates adapted to be inserted in the mouth of a patient in superimposed relation, the lower of said plates having means for recording centric relation and the upper plate being adapted to fit on said lower plate and to cover said means, the upper surface of said upper plate being substantially smooth and planar.

2. A dental apparatus for use in making dentures comprising a pair of substantially U-shaped plates adapted to be inserted in the patient's mouth in superimposed relation, the lower plate having means for recording centric relation, said means including an adjustable upstanding pin having one position of adjustment where it extends above said lower plate, means to lower said pin from its position above said lower plate, the upper plate being adapted to embrace the lower plate and having an upper surface which is substantially smooth and planar.

3. A dental apparatus according to claim 2 and wherein said means to lower said upstanding pin from its position above said lower plate comprises means for vertically adjusting said pin so that it becomes recessed within the thickness of said lower plate.

4. A dental apparatus according to claim 3 and wherein said last-named means comprises a rotatable wheel embracing said pin, and power transmission means between said wheel and said pin whereby rotation of said wheel in one direction raises said pin and in the other direction lowers said pin.

5. A dental apparatus for use in making dentures comprising a pair of substantially U-shaped plates adapted to be inserted in the patient's mouth in superimposed relation, the lower plate having means for recording centric relation, said means including a front central boss and an adjustable upstanding pin having a position of adjustment where it extends above the upper surface of said boss, means to lower said pin from its said position to a second position where it is recessed within the thickness of said boss, the upper plate being adapted to embrace the lower plate and being formed with a front central cut-out which embraces and accommodates the boss, the composite upper and lower plates, when connected, having uniformly parallel upper and lower surfaces.

6. A dental apparatus according to claim 5 and including spring means on the upper plate to grasp the lower plate.

7. A dental apparatus comprising a plate for recording centric relation, said plate being substantially U-shaped and having a vertically adjustable pin on the front center thereof, said pin being retractable to positions both above and below the upper surface of said plate.

8. A dental apparatus according to claim 7 and including a boss formed at said front center, said pin being vertically adjustable in said boss, and a rotatable wheel extending forwardly of said boss and connected to said pin and adapted to actuate it vertically in a direction depending upon the direction of rotation of said wheel.

9. A dental apparatus comprising a plate for recording centric relation, said plate being adapted to be inserted in the mouth, resiliently depressible means disposed in spaced relation on the upper side of said plate so as to be depressible by the action of the respective jaws, a vertically upstanding pin disposed on the front center of said plate, said plate being U-shaped, said resiliently depressible means comprising a pair of studs respectively disposed on each arm of the U-shaped plate, springs disposed in openings formed in said plate and normally urging said studs outwardly of the plate, and a front, central boss formed on said U-shaped plate, said pin being disposed in said boss and being vertically adjustable therein.

10. A dental apparatus according to claim 9 and including a pair of cut-outs formed in said plate on either side of said boss and adapted to retain wax wads for recording positions of said plate in relation to an adjacent bite recording element.

11. A dental apparatus according to claim 10 and wherein said studs have flat heads, said boss being formed with a front slot and a wheel rotatably mounted within said slot, said wheel being geared to said pin, said gearing being adapted to move the pin vertically when the wheel is rotated in a horizontal direction.

References Cited in the file of this patent

UNITED STATES PATENTS

| | | |
|---|---|---|
| 2,507,118 | Opotow | May 9, 1950 |
| 2,618,853 | Singer et al. | Nov. 25, 1952 |